United States Patent
Zhen et al.

(10) Patent No.: US 11,354,781 B2
(45) Date of Patent: Jun. 7, 2022

(54) SINGLE-IMAGE DETAIL AND CONTRAST ENHANCEMENT

(71) Applicant: Samsung Electronics Co., Ltd., Suwon-si (KR)

(72) Inventors: Ruiwen Zhen, Allen, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/103,809

(22) Filed: Nov. 24, 2020

(65) Prior Publication Data

US 2022/0020120 A1 Jan. 20, 2022

Related U.S. Application Data (60) Provisional application No. 63/054,174, filed on Jul. 20, 2020.

(51) Int. Cl.
*G06T 5/00* (2006.01)
*G06T 5/20* (2006.01)

(52) U.S. Cl.
CPC .............. *G06T 5/002* (2013.01); *G06T 5/20* (2013.01); *G06T 2207/20182* (2013.01)

(58) Field of Classification Search
None
See application file for complete search history.

(56) References Cited

U.S. PATENT DOCUMENTS

| | | | |
|---|---|---|---|
| 8,571,355 B2 | 10/2013 | Lee et al. | |
| 10,282,830 B2 | 5/2019 | Wang et al. | |
| 10,460,231 B2 | 10/2019 | Zhang et al. | |
| 2008/0192064 A1* | 8/2008 | Hong | G06T 5/40 345/582 |
| 2011/0026815 A1* | 2/2011 | Han | G06T 5/008 382/164 |
| 2016/0048952 A1* | 2/2016 | Tezaur | G06T 5/004 382/255 |

(Continued)

FOREIGN PATENT DOCUMENTS

JP 2006203717 A 8/2006

OTHER PUBLICATIONS

Zhang et al, Super-resolution of single multi-color image with guided filter, vol. 58, Jan. 2019, pp. 277-284 (Year: 2019).*

(Continued)

*Primary Examiner* — Andrae S Allison (57) ABSTRACT

A method includes obtaining, using at least one processor, an image of a scene including image data in each of multiple channels of a color space. The method also includes decomposing a channel of the image into a first base layer and a first detail layer. The method further includes generating a first enhanced detail layer by manipulating a characteristic of the first detail layer. The method also includes decomposing the first base layer into a second base layer and a second detail layer. The method further includes generating a second enhanced detail layer by manipulating a characteristic of the second detail layer. In addition, the method includes combining the first enhanced detail layer, the second enhanced detail layer, and the second base layer to obtain an enhanced image of the scene.

20 Claims, 6 Drawing Sheets

(56) References Cited

U.S. PATENT DOCUMENTS

| | | | |
|---|---|---|---|
| 2016/0080626 A1* | 3/2016 | Kovtun | H04N 5/2355 |
| | | | 348/218.1 |
| 2016/0275675 A1* | 9/2016 | Nakajima | G06T 5/20 |
| 2016/0321790 A1* | 11/2016 | Wang | G06T 5/40 |
| 2019/0116359 A1 | 4/2019 | Dong et al. | |
| 2020/0349677 A1* | 11/2020 | Lee | G06T 3/4046 |
| 2020/0372608 A1* | 11/2020 | Lee | G06T 7/13 |
| 2021/0166360 A1* | 6/2021 | Kim | G06F 17/11 |
| 2022/0014684 A1* | 1/2022 | Zhou | H04N 5/232935 |

OTHER PUBLICATIONS

Zhu, Shujin, and Zekuan Yu. "Self-guided filter for image denoising." IET Image Processing 14.11 (2020): 2561-2566. (Year: 2020).*
Zheng, Xianhui, et al. "Single-image-based rain and snow removal using multi-guided filter." International Conference on Neural Information Processing. Springer, Berlin, Heidelberg, 2013. (Year: 2013).*
Tufail et al, Improved Dark Channel Prior for Image Defogging Using RGB and YCbCr Color Space, Digital Object Identifier 10.1109/ACCESS.2018; 2843261 (Year: 2018).*
He et al., "Fast Guided Filter," https://arxiv.org/pdf/1505.00996.pdf, May 2015, 2 pages.

* cited by examiner

SINGLE-IMAGE DETAIL AND CONTRAST ENHANCEMENT

CROSS-REFERENCE TO RELATED APPLICATION AND PRIORITY CLAIM

This application claims priority under 35 U.S.C. § 119(e) to U.S. Provisional Patent Application No. 63/054,174 filed on Jul. 20, 2020, which is hereby incorporated by reference in its entirety.

TECHNICAL FIELD

This disclosure relates generally to imaging systems. More specifically, this disclosure relates to single-image detail and contrast enhancement.

BACKGROUND

Due to poor lighting conditions and limited dynamic ranges of smartphone cameras and cameras of other portable devices, acquired images often have low contrast areas that degrade the visual aesthetics of the images. Image contrast enhancement techniques aim to improve contrast and make image details more visible. A global operator, which is often based on an image histogram distribution, can apply a uniform pixel-wise adjustment to all pixels of an image, which enhances the overall contrast at the cost of losing local contrast and detail. In comparison, a local operator can map values depending on local content without changing the entire image's brightness. However, the most commonly-seen local enhancement techniques usually produce serious unrealistic artifacts, such as block discontinuities, noise amplification, and halo.

SUMMARY

This disclosure provides systems and methods for single-image detail and contrast enhancement.

In a first embodiment, a method includes obtaining, using at least one processor, an image of a scene including image data in each of multiple channels of a color space. The method also includes decomposing a channel of the image into a first base layer and a first detail layer. The method further includes generating a first enhanced detail layer by manipulating a characteristic of the first detail layer. The method also includes decomposing the first base layer into a second base layer and a second detail layer. The method further includes generating a second enhanced detail layer by manipulating a characteristic of the second detail layer. In addition, the method includes combining the first enhanced detail layer, the second enhanced detail layer, and the second base layer to obtain an enhanced image of the scene.

In a second embodiment, an electronic device includes at least one processor and at least one memory. The at least one memory contains instructions that, when executed by the at least one processor, cause the electronic device to obtain an image of a scene including image data in each of multiple channels of a color space. The medium also includes instructions that, when executed by the at least one processor, cause the electronic device to decompose a channel of the image into a first base layer and a first detail layer. The medium further includes instructions that, when executed by the at least one processor, cause the electronic device to generate a first enhanced detail layer by manipulating a characteristic of the first detail layer. The medium also includes instructions that, when executed by the at least one processor, cause the electronic device to decompose the first base layer into a second base layer and a second detail layer. The medium further includes instructions that, when executed by the at least one processor, cause the electronic device to generate a second enhanced detail layer by manipulating a characteristic of the second detail layer. In addition, the medium includes instructions that, when executed by the at least one processor, cause the electronic device to combine the first enhanced detail layer, the second enhanced detail layer, and the second base layer to obtain an enhanced image of the scene.

In a third embodiment, a non-transitory computer-readable medium includes instructions that, when executed by at least one processor, cause an electronic device to obtain an image of a scene including image data in each of multiple channels of a color space. The medium also includes instructions that, when executed by the at least one processor, cause the electronic device to decompose a channel of the image into a first base layer and a first detail layer. The medium further includes instructions that, when executed by the at least one processor, cause the electronic device to generate a first enhanced detail layer by manipulating a characteristic of the first detail layer. The medium also includes instructions that, when executed by the at least one processor, cause the electronic device to decompose the first base layer into a second base layer and a second detail layer. The medium further includes instructions that, when executed by the at least one processor, cause the electronic device to generate a second enhanced detail layer by manipulating a characteristic of the second detail layer. In addition, the medium includes instructions that, when executed by the at least one processor, cause the electronic device to combine the first enhanced detail layer, the second enhanced detail layer, and the second base layer to obtain an enhanced image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, in accordance with this disclosure, an electronic device may be one or a combination of the above-listed devices. In accordance with this disclosure, the electronic device may be a flexible electronic device. The electronic device disclosed here is not limited to the above-listed devices and may include any other electronic devices now known or later developed.

In the following description, electronic devices are described with reference to the accompanying drawings, in accordance with this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
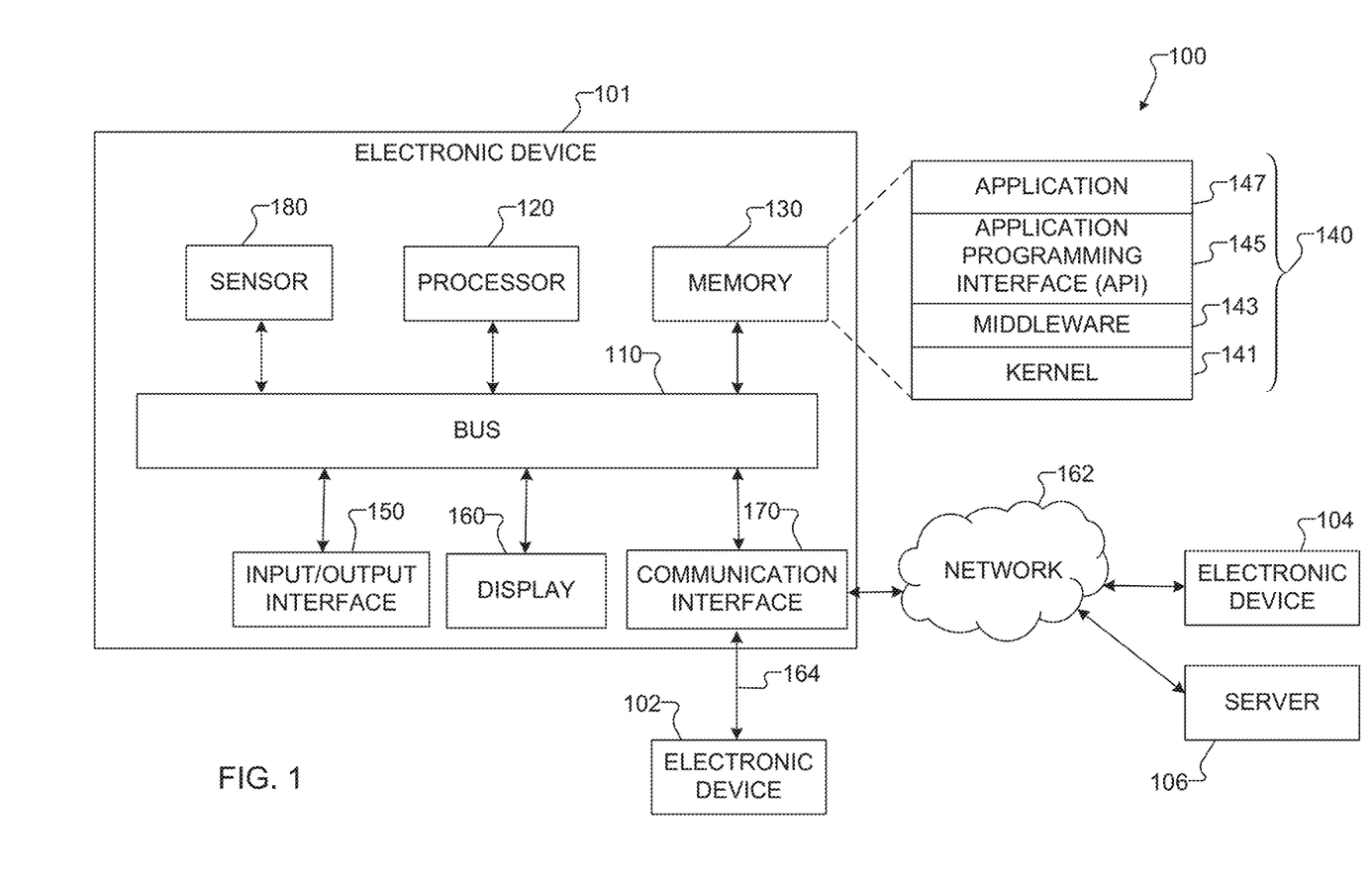
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process image frames and generate enhanced frames using single-image detail and contrast enhancement techniques as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process image frames and generate enhanced frames using single-image detail and contrast enhancement techniques as described in more detail below. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. In some embodiments of this disclosure, the server 106 includes a group of one or more servers. Also, in some embodiments of this disclosure, all or some of the operations executed on the electronic device 101 can be executed on another or multiple other electronic devices (such as the electronic devices 102 and 104 or server 106). Further, in some embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function in some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process image frames and generate enhanced frames using single-image detail and contrast enhancement techniques as described in more detail below Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
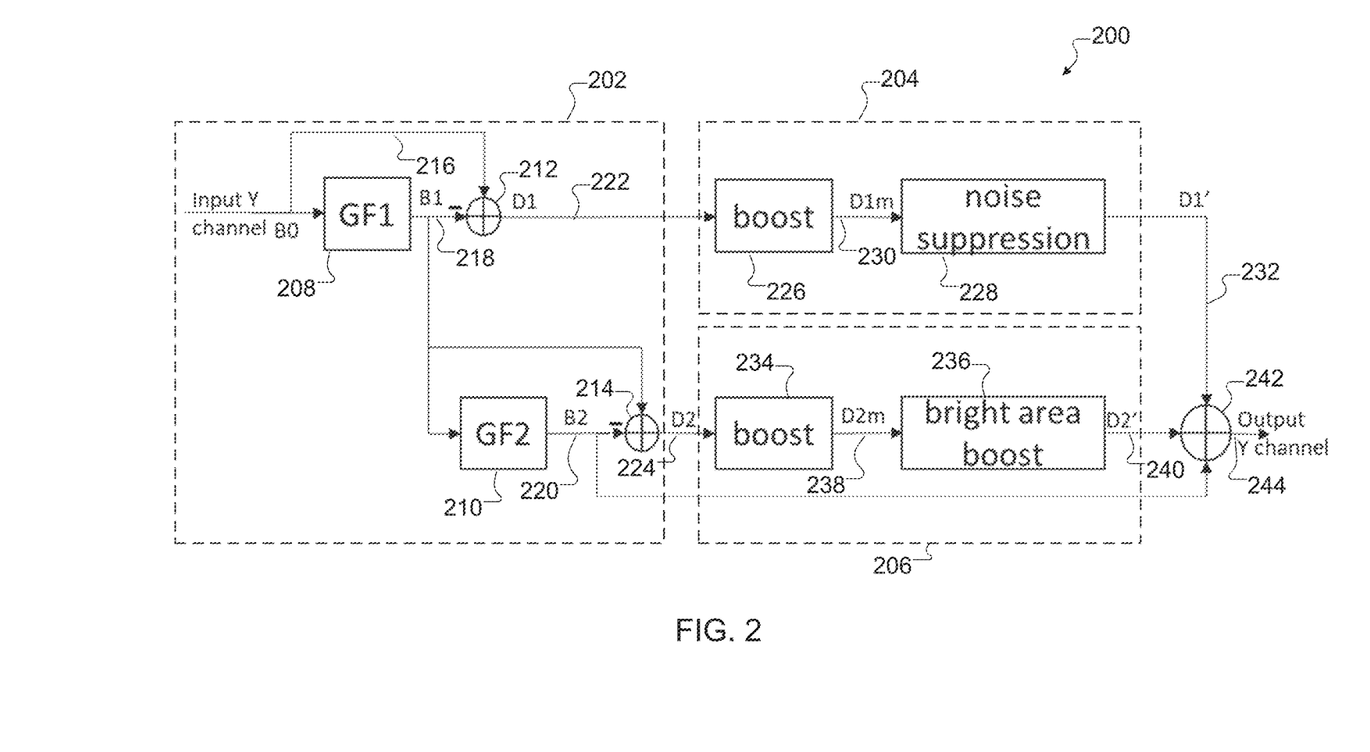
FIG. 2 illustrates an example technique for providing single-image detail and contrast enhancement in accordance with this disclosure.

FIG. 2 illustrates an example technique 200 for providing single-image detail and contrast enhancement in accordance with this disclosure. For ease of explanation, the technique 200 of FIG. 2 may be described as being used by the electronic device 101 of FIG. 1. However, the technique 200 may be used with any suitable device(s) and in any suitable system(s), such as when the technique 200 is used with the server 106 in FIG. 1 or in another system.

As shown in FIG. 2, the technique 200 includes a multi-guided filter process 202, a detail enhancement and noise suppression process 204, and a contrast enhancement process 206. The technique 200 enhances characteristics, including details and contrast, of a single input image. While the illustration and description of the technique 200 includes two image enhancement processes (the detail enhancement and noise suppression process 204 and the contrast enhancement process 206), any number of image enhancement processes may be used in parallel or serially.

Figure 3:
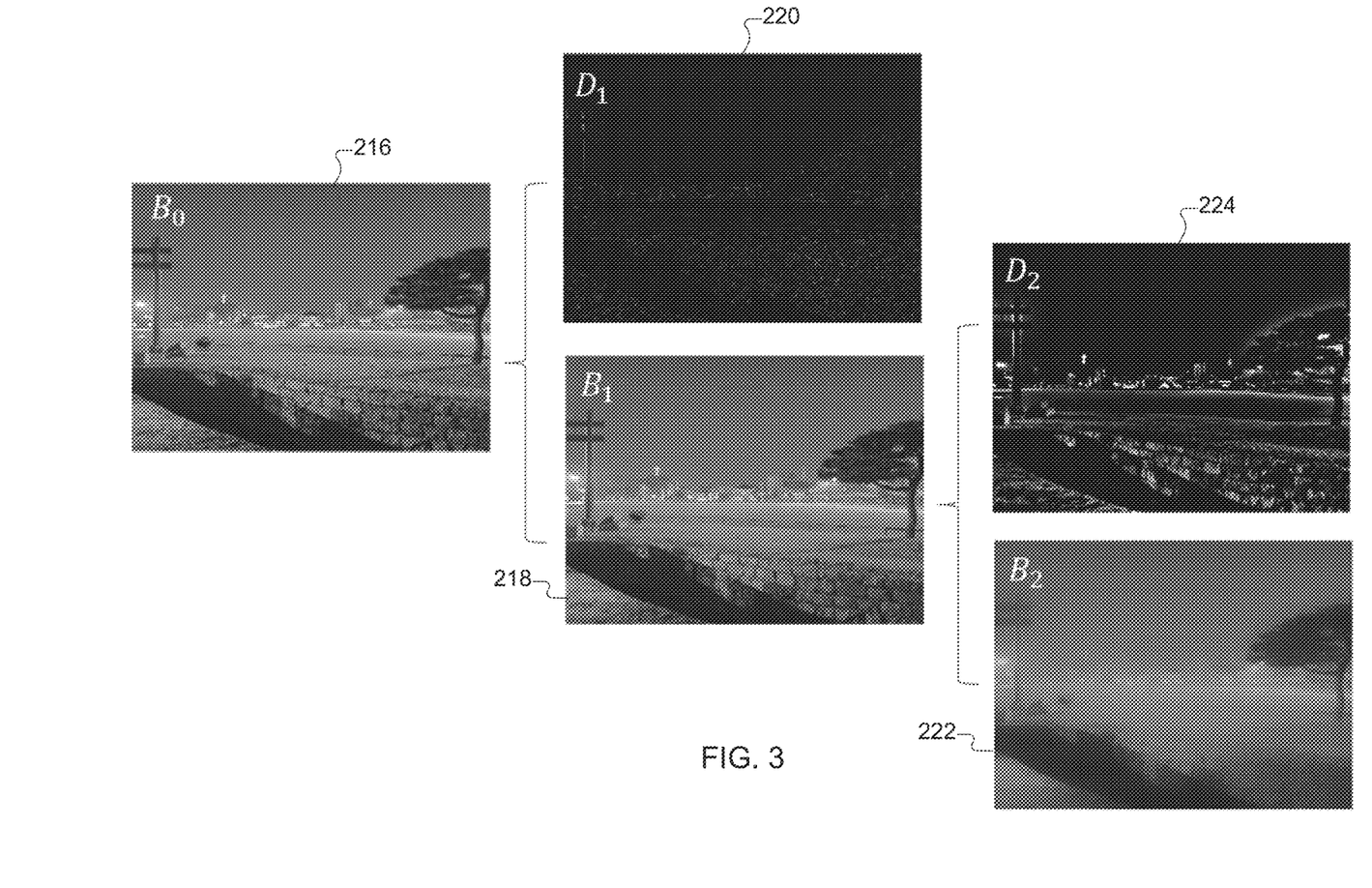
FIG. 3 illustrates an example multi-guided filter operation for decomposing input image data into base and detail layers in accordance with this disclosure.

The multi-guided filter process 202 processes an input image and generates a coarse, piecewise smooth version of the image and a second base layer ($B_2$), along with a sequence of difference images capturing detail layers ($D_1$, $D_2$) at progressively finer scales. In this example, the multi-guided filter process 202 includes a first guided filter operation 208, a second guided filter operation 210, a first difference operation 212, and a second difference operation 214. The multi-guided filter process 202 separates an input luminance image 216 on a Y channel into a first base layer 218, a second base layer 220, a first detail layer 222, and a second detail layer 224. Note that while two guided filter operations 208 and 210 are illustrated in FIG. 2, the multi-guided filter process 202 can include any number of guided filters that correspond to any desired amount of image enhancement processes. Example operations of the multi-guided filter process 202 are illustrated in FIG. 3, which is described below.

The first guided filter operation 208 and the second guided filter operation 210 are edge-preserving filters, which can blur image details while preserving strong edges of an image. In some embodiments, the first and second guided filter operations 208 and 210 can have two main properties, which include edge-preserving smoothing images and a processing time that is almost independent of kernel size (or image size). The operations of each guided filter operation 208 and 210 are represented by $G_{r,\varepsilon}(p, I)$, where r and $\varepsilon$ are parameters that control a filter size and a blur degree of the guided filter, p represents an input image, and I represents a guidance image. The parameters r and $\varepsilon$ can be chosen in any suitable manner, such as based on an image tuning process corresponding to a respective guided filter operation. Each of the guided filter operations 208 and 210 may be expressed as follows:

$$B_k = G_{r,\varepsilon}(B_{k-1}, B_{k-1}), k=1, \ldots K \quad (1)$$

where $B_k$ represents a base layer of a luminance image, $B_{k-1}$ represents a previous base layer, r represents a kernel size corresponding to a radius that defines a size of a square window $w_k$ used to define $a_k$ and $b_k$, and $\varepsilon$ represents a parameter for dictating how heavily a smoothing process is applied. Linear coefficients $a_k$ and $b_k$ are assumed to be constant in the window $w_k$, where $w_k$ is a window centered at pixel k. Given that, each of the guided filter operations 208 and 210 may then be expressed as follows:

$$G_{r,\varepsilon}(p,I) = q_i = a_k I_i + b_k, \forall i \in w_k \quad (2)$$

where $q_i$ represents an $i^{th}$ output pixel for an output image q, and $I_i$ represents an $i^{th}$ guidance image pixel for a guidance image I. A cost function in a window can be minimized as a solution for the linear coefficients ($a_k$, $b_k$) in order to minimize a difference between an output image q and an input image p. In some cases, the cost function may be expressed as follows:

$$E(a_k, b_k) = \Sigma_{i \in w_k}((a_k I_i + b_k - p_i)^2 + \varepsilon a_k^2) \quad (3)$$

where $\varepsilon$ represents a regularization parameter (referred to as a degree of smoothing). Once the cost function is minimized, an output image q can be generated. The guided filter operations 208 and 210 use a previous base layer $B_{k-1}$ as both the input image p and the guidance image I. One result of the first and second guided filter operations 208 and 210 is the generation of the base layer $B_k$ as the output image q.

The first guided filter operation 208 receives the input luminance image 216, which corresponds to the previous base layer $B_{k-1}$. One example of an input luminance image 216 is shown in FIG. 3. The input luminance image 216 depicts light intensity for an input image. In the example input luminance image 216 shown in FIG. 3, the image 216 captures a scene of buildings lining the horizon, which is a long distance behind a field. A top half of the image 216 is mostly sky with very little luminance detail. On a left side of the image 216 is an electrical pole, and on a right side of the image 216 is a tree. A stone wall runs from the left side to the right side of a forefront in the image 216.

The first guided filter operation 208 generates the first base layer 218, which corresponds to the base layer $B_k$ as the output image q. The first guided filter operation 208 has parameters r and $\varepsilon$ chosen based on the detail enhancement and noise suppression process 204. In some embodiments, r can be set to three and $\varepsilon$ can be set to 0.01 for a guided filter operation associated with the detail enhancement and noise suppression process 204. One example of the first base layer 218 is illustrated in FIG. 3. The purpose of the first guided filter operation 208 is to capture fine details and noise, which is accomplished using highest-frequency information. In the example first base layer 218 shown in FIG. 3, the first base layer 218 appears slightly blurrier in locations with fine details. For example, the sharpness for boundaries of the bricks at the bottom of the first base layer 218 is reduced. Lights on the buildings along the horizon also appear to overlap or blend into each adjacent light more significantly than in the input luminance image 216. The first base layer 218 is output to the second guided filter operation 210 and the first difference operation 212.

The second guided filter operation 210 receives the first base layer 218, which corresponds to the previous base layer $B_{k-1}$ in Equation (1). The second guided filter operation 210 corresponds to the contrast enhancement process 206 and is used to filter out large-scale edge and flat areas suitable for contrast enhancement, which is accomplished using mid-frequency information or low-frequency information. In some embodiments, r can be set to sixty four and $\varepsilon$ can be set to 0.01 for a guided filter operation 210 associated with the contrast enhancement process. The second guided filter operation 210 generates the second base layer 220. One example of the second base layer 220 is illustrated in FIG. 3. In the example second base layer 220 shown in FIG. 3, the second base layer 220 has more significant differences in detail from the first base layer 218 than differences between the first base layer 218 and the input luminance image 216. For example, the buildings along the horizon are almost completely blurred out and almost indistinguishable from the field. The brick wall at the bottom of the second base layer 220 appears to be a solid wall with minor indentions. Both the tree and the electric pole are still distinguishable but have muted luminance intensity. Note that while FIG. 2 illustrates two guided filter operations, more layered guided filter operations can be added in a similar manner to the second guided filter operation 210 with a base layer generated by a previous guided filter operation as an input.

Each of the first and second difference operations 212 and 214 produces a detail layer by identifying the difference between a base layer and the previous base layer. As $B_0, \ldots, B_K$ denote progressively-coarser versions of the input luminance image 216 generated by guided filtering (where $B_0$ is the input luminance image), the detail layers can be obtained as follows:

$$D_k = B_{k-1} - B_k, k=1, \ldots K \quad (4)$$

where $D_k$ represents details of the layer k. The first difference operation 212 removes some brightness of the input luminance image 216 on a pixel-by-pixel basis by subtracting the first base layer 218 to generate the first detail layer 222. One example of the first detail layer 222 is illustrated in FIG. 3. In the example first detail layer 222 shown in FIG. 3, the first detail layer 222 has detail in areas where the input luminance image 216 has detailed objects, such as the buildings along the horizon, the electrical pole, the tree, and the brick wall. The first detail layer 222 has almost no detail in areas corresponding to the sky at the top of the image and a shadow across the brick wall at the bottom left of the image. The first difference operation 212 outputs the first detail layer 222 to the detail enhancement and noise suppression process 204.

The second difference operation 214 removes some brightness of the first base layer 218 on a pixel-by-pixel basis by subtracting the second base layer 220 to generate the second detail layer 224. One example of the second detail layer 224 is illustrated in FIG. 3. In the example second detail layer 224 shown in FIG. 3, the second detail layer 224 has significant detail in areas where the first base layer 218 has areas of high difference in luminance, such as the between the lights on the buildings along the horizon, the edge around the electrical pole, the edge around the tree, and the areas of roughness on the brick wall. The second detail layer 224 has almost no detail in areas corresponding to the sky at the top of the image and a shadow across the brick wall at the bottom left of the image. The second difference operation 214 outputs the second detail layer 224 to the detail enhancement and noise suppression process 204. Note that while FIG. 2 illustrates two difference operations, any number of difference operations can be used corresponding to the number of the guided filter operations.

The detail enhancement and noise suppression process 204 focuses on reducing the noise and artifacts from the input luminance image 216. The detail enhancement and noise suppression process 204 receives the first detail layer 222 from the first difference operation 212 in the multi-guided filter process 202. In this example, the detail enhancement and noise suppression process 204 includes a first boost operation 226 and a noise suppression operation 228.

Figure 4A:
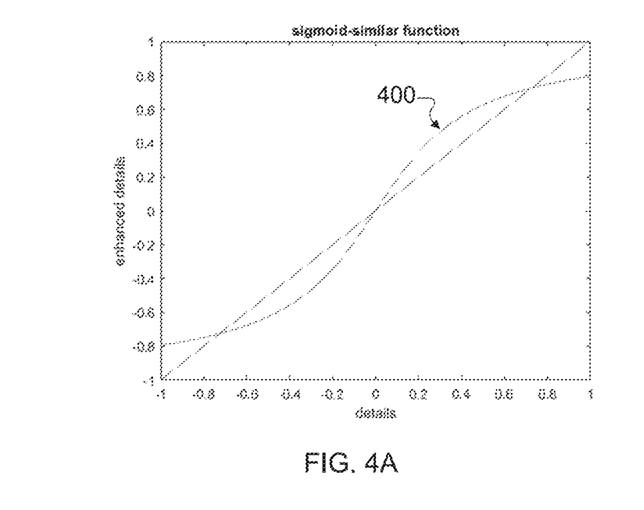
FIGS. 4A and 4B illustrate example sigmoid-similar and smooth step functions in accordance with this disclosure.
Figure 5A:
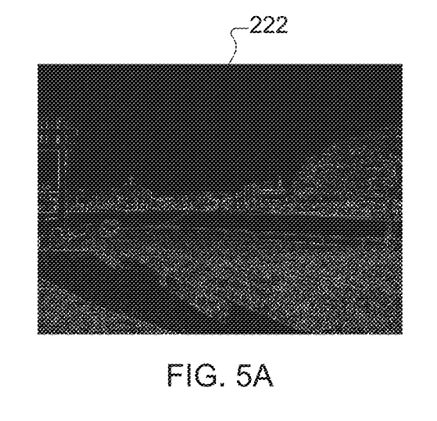
FIGS. 5A, 5B, and 5C illustrate example detail, boosted detail, and contrast enhanced layers in accordance with this disclosure.
Figure 5B:
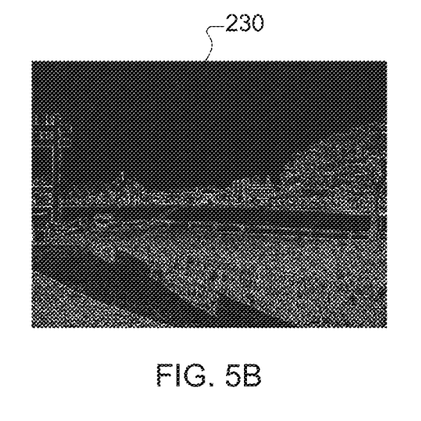

The first boost operation 226 modifies fine-scale details of the first detail layer 222. The first detail layer 222 is reproduced in FIG. 5A. In some cases, the first boost operation 226 modifies fine-scale details of the first detail layer 222 using a sigmoid-similar function 400, one example of which may be expressed as follows:

$$D_1 m = f_s(D_1, \delta_1) = 2 * \arctan(\delta_1 * D_1) / \pi \quad (5)$$

where $D_1 m$ represents a boosted first detail layer 230 (one example of which is shown in FIG. 5B), and $\delta_1$ represents a boost parameter. In some embodiments, the boost parameter $\delta_1$ can be a value around 2.5. The sigmoid-similar function 400 processes positive and negative details symmetrically, boosting details around zero and suppressing details close to one. One example of a sigmoid-similar function 400 is shown in FIG. 4A. In the example sigmoid-similar function 400 shown in FIG. 4A, input details close to −1 and 1 experience an enhancement by reducing a magnitude of detail, while input details close to −0.75, 0, and 0.75 are not enhanced much if at all. The details between −0.75 and 0 are processed with an opposite effect from the details below −0.75, which could be an enhancing of details. The details between 0 and 0.75 are processed with an opposite effect from the details above 0.75, which could be an enhancing of details.

The first boost operation 226 makes noise and artifacts more visible due to the symmetrical nature of the sigmoid-similar function 400. As shown in FIG. 5B, the boosted first detail layer 230 shows noise amplification in the sky, where the details are at the lowest. Most of the other details outside of the sky and the shadow in the boosted first detail layer 230 are enhanced due to the original details not being outside of the −0.75 to 0.75 range. In order to mitigate the more visible noise and artifacts, the boosted first detail layer 230 is output to the noise suppression operation 228.

Figure 4B:
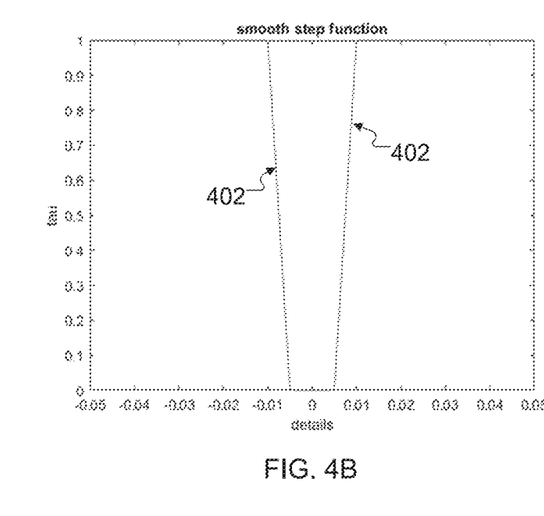

The noise suppression operation 228 reduces the noise in the boosted first detail layer 230. The mitigation can be performed by a function expressed as follows:

$$D_1' = \tau * D_1 m + (1-\tau) * D_1 \quad (6)$$

where $\tau$ represents a smooth step function 402 equal to zero if $D_1$ is less than $thr_1$ and equal to one if $D_1$ is more than $thr_2$ (with a smooth linear transition between the thr1 and thr2), and $D_1'$ represents a noise suppressed detail layer 232. One example of a smooth step function 402 is shown in FIG. 4B. In the example smooth step function 402 shown in FIG. 4B, the thr1 parameter is 0.005, and the thr2 parameter is 0.01. When the details are outside a first range of −0.01 and 0.01, the value of $\tau$ is one. When the details are within a second range of −0.005 and 0.005, the value of $\tau$ is zero. The value of $\tau$ is defined based on the smooth step function 402 between zero and one as the value of the details is between the first range and the second range.

Figure 5C:
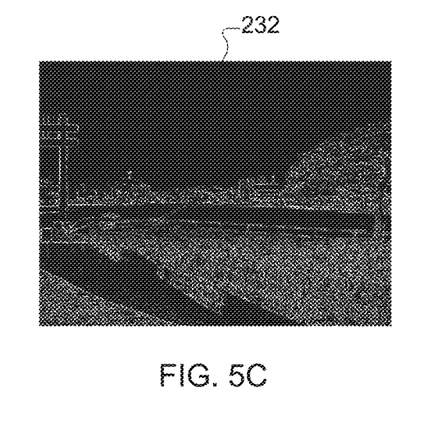

The noise suppression operation 228 generates the noise suppressed detail layer 232 based on the smooth step function 402. The noise suppressed detail layer 232 (one example of which is shown in FIG. 5C) has reduced detail in the sky at the top of the image. As the detail in the sky is within the second range, the noise suppressed detail layer 232 has the details in the sky and the shadow muted. The noise suppressed detail layer 232 is output from the noise suppression operation 228 and the detail enhancement and noise suppression process 204.

The contrast enhancement process 206 receives the second detail layer 224 from the second difference operation 214 in the multi-guided filter process 202. The contrast enhancement process 206 enhances a local contrast of the input luminance image 216 using the second detail layer 224. In this example, the contrast enhancement process 206 includes a second boost operation 234 and a bright area boost operation 236.

Figure 6A:
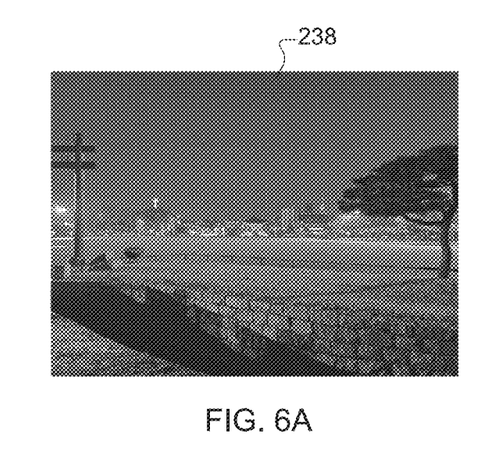
FIGS. 6A and 6B illustrate example boosted detail and bright area enhanced layers in accordance with this disclosure.

The second boost operation 234 modifies brightness and contrast details in the input luminance image 216. The modification of the second detail layer 224 may be expressed as follows:

$$D_2 m = f_s(D_2, \delta_2) = 2 * \arctan(\delta_2 * D_2) / \pi \quad (7)$$

where $D_2 m$ represents a boosted second detail layer 238 (one example of which is shown in FIG. 6A), and $\delta_2$ represents a boost parameter that controls a contrast level. In some embodiments, the boost parameter $\delta_2$ can be around two. If the boost parameter $\delta_2$ is too large, the entire image may be over-contrasted, and halo artifacts can be more severe. One example of the boosted second detail layer 238 is shown in FIG. 6A. In the example boosted second detail layer 238 shown in FIG. 6A, the boosted second detail layer 238 has similar enhancement of details compared to the boosted first detail layer 230. For example, some of the buildings along the horizon have an increased brightness in darker area, and objects that are thinner such as the electrical pole and a fence across the field are muted. In embodiments where additional image processes are included in the technique 200, the boost operation may be optional in the additional image processes.

In other embodiments, either of the first and second boost operations 226 and 234 may be expressed as follows:

$$f_s(x, \delta) = \frac{1}{1 + e^{-\delta x}} \quad (8)$$

$$f_s(x, \delta) = |x|^\delta \quad (9)$$

Figure 6B:
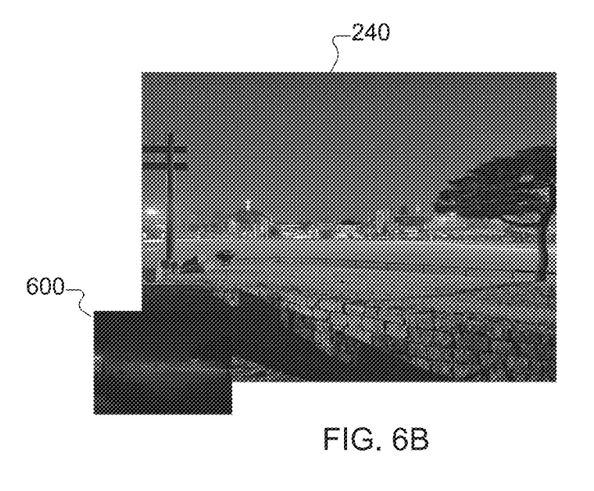

The bright area boost operation 236 receives the boosted second detail layer 238 from the second boost operation 234. Generally, bright areas suffer from low contrast issues more than dark areas. The bright area boost operation 236 is used to further increase the contrast of bright areas. As boosting positive details of bright areas leads to loss of saturation details, only negative details may be enhanced. In some cases, a bitmap 600 defining the bright areas may be expressed as:

$$Bmap = e^{-\frac{(B_2 - 1.0)^2}{2\sigma^2}} \quad (10)$$

where Bmap represents the brightness bitmap 600, and $B_2$ and $\sigma$ are brightness parameters. In some embodiments, the brightness parameter $\sigma$ can be around 0.3. As shown in FIG. 6B, the bitmap 600 shows significant brightness in the buildings along the horizon across the middle of the boosted second detail layer 238. The tree, the electrical pole, and the bricks around the shadow are areas of low brightness. The generation of a brightness enhanced detail layer 240 can be expressed as follows:

$$D_2'=D_2m+f_s(D_2,\delta_3)*(D_2<0) \quad (11)$$

where $D_2'$ represents the brightness enhanced detail layer 240, and $\delta_3$ represent a brightness boost parameter. In some embodiments, $\delta_3$ can be around four. As shown in FIG. 6B, the brightness enhanced detail layer 240 enhanced the negative details of brightness. For example, the walls on the buildings along the horizon have sharper dark features, as do the electrical pole, the fence, and the tree.

An addition operation 242 of the technique 200 receives the noise suppressed detail layer 232, the brightness enhanced detail layer 240, and the second base layer 220. The addition operation 242 adds or otherwise combines the different layers 220, 232, 240 together on a pixel-by-pixel basis to form an output luminance image 244. The addition operation 242 receives an enhanced detail layer from each of the processes and a base layer from the last guided filter operation. For example, a technique with four enhancement processes will have four corresponding enhanced detail layers provided to the addition operation 242, along with a base layer from the fourth guided filter operation.

Note that the functions and other operations described above with reference to FIG. 2 can be implemented in an electronic device 101, 102, 104, server 106, or other device in any suitable manner. For example, in some embodiments, the operations described above can be implemented or supported using one or more software applications or other software instructions that are executed by at least one processor 120 of a device. In other embodiments, at least some of the operations described above can be implemented or supported using dedicated hardware components. In general, the operations described above can be performed using any suitable hardware or any suitable combination of hardware and software/firmware instructions.

Although FIG. 2 illustrates one example of a technique 200 for providing single-image detail and contrast enhancement and FIGS. 3 through 6B illustrate examples of different results or functions, various changes may be made to FIGS. 2 through 6B. For example, the technique 200 shown in FIG. 2 may have additional processes for adjusting different properties of a luminance input image or different processes for adjust properties of different channels. Also, the contents of the images shown here are for illustration only and can vary widely based on the images being captured and processed. In addition, similar operations may occur in each channel of each input image.

Figure 7:
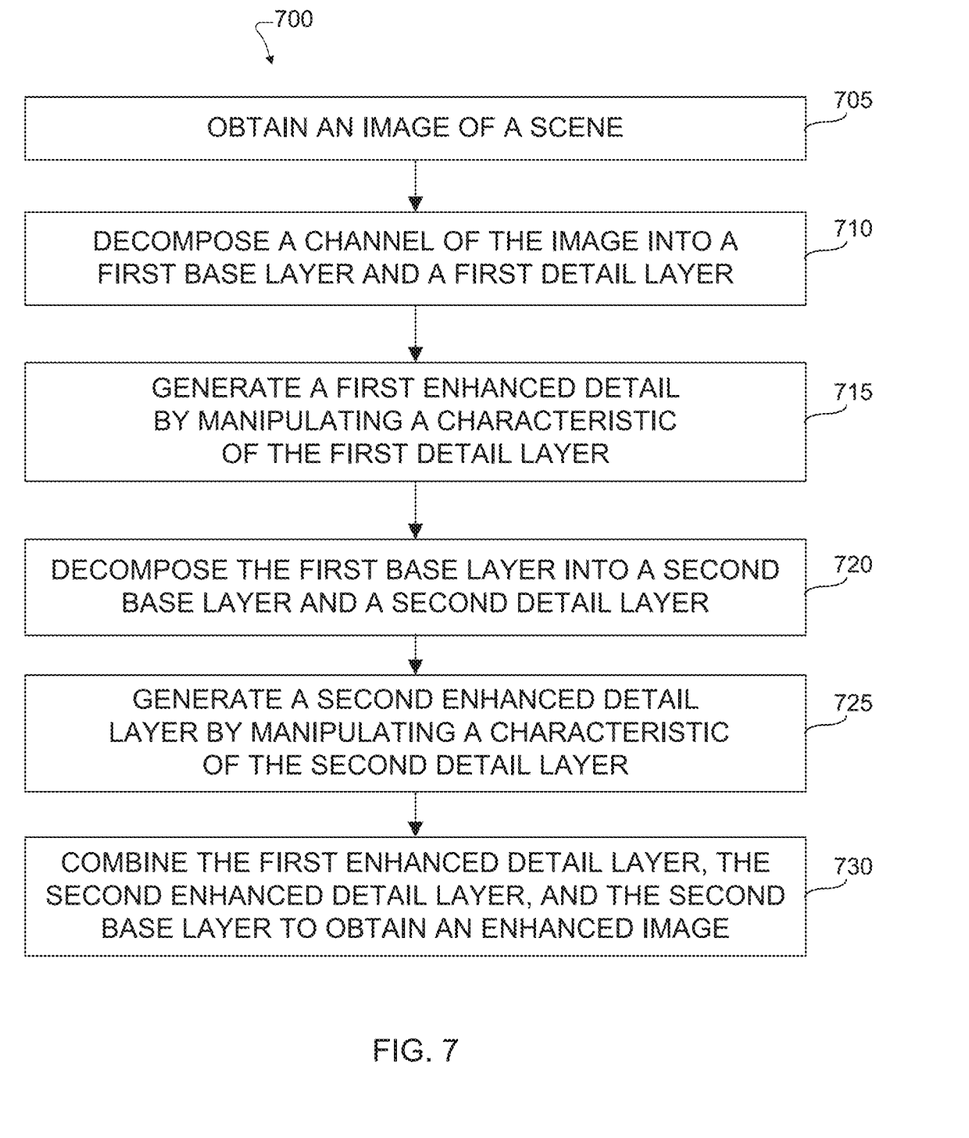
FIG. 7 illustrates an example method for performing single-image detail and contrast enhancement in accordance with this disclosure.

FIG. 7 illustrates an example method 700 for performing a single-image detail and contrast enhancement technique 200 in accordance with this disclosure. For ease of explanation, the method 700 of FIG. 7 may be described as being performed by the electronic device 101 of FIG. 1. However, the method 700 may be performed with any suitable device(s) and in any suitable system(s), such as when the method 700 is performed by the server 106 in FIG. 1 or in another system.

As shown in FIG. 7, a processor 120 of an electronic device 101 obtains an image 216 of a scene at step 705. This may include, for example, the processor 120 obtaining the image using at least one camera or other imaging sensor 180. The input image 216 includes image data in multiple channels of a color space (such as the RGB or YCbCr color space). The processor 120 decomposes a channel of the input image 216 into a first base layer 218 and a first detail layer 222 at step 710. This may include, for example, the processor 120 applying multiple guided filter operations 208 and 210 or other function(s) to the image data in at least one channel to decompose the channel(s). In some embodiments, the first detail layer 222 includes the highest-frequency information.

The processor 120 generates a first enhanced detail layer 232 by manipulating a characteristic of the first detail layer at step 715. This may include, for example, the processor 120 suppressing noise when the first detail layer 222 contains highest-frequency information and applying a smooth step function to transit between noise suppression and detail enhancement. In some embodiments, the characteristic of the first detail layer 222 is the detail of the image. The manipulation of the characteristic of the first detail layer 222 could be performed on local image patches defined by a weight map (such as the bitmap 600). The manipulation of the characteristic of the first detail layer 222 could use a sigmoid-similar function 400, where a one-sided or double-sided sigmoid-similar function can be applied to the first detail layer 222.

The processor 120 decomposes the first base layer 218 into a second base layer 220 and a second detail layer 224 at step 720. This may include, for example, the processor 120 applying multiple guided filter operations 208 and 210 or other function(s) to the first base layer 218. In some embodiments, the second detail layer 224 or subsequent detail layer includes mid-frequency information or low-frequency information, and the frequency level may decrease for each subsequent detail layer.

The processor 120 generates a second enhanced layer 240 by manipulating a characteristic of the second detail layer 224 at step 725. In some embodiments, the characteristic of the second detail layer 224 is a contrast of the image, and the manipulation of the characteristic of the second detail layer 224 includes manipulating contrast in the second detail layer. The manipulation of the characteristic of the second detail layer 224 could be performed on local image patches defined by the weight map. The manipulation of the characteristic of the second detail layer 224 could use a sigmoid-similar function 400, where a one-sided or double-sided sigmoid-similar function can be applied to the second detail layer 224.

The processor 120 combines the first enhanced detail layer 232, the second enhanced detail layer 240, and the second base layer 220 to obtain an enhanced image 244 at step 730. This may include, for example, the processor 120 performing the combination on a pixel-by-pixel basis using corresponding pixels from the first enhanced detail layer 232, the second enhanced detail layer 240, and the second base layer 220. The enhanced image 244 is detail and contrast enhanced from the original input image 216.

Although FIG. 7 illustrates one example of a method 700 for single-image detail and contrast enhancement, various changes may be made to FIG. 7. For example, while shown as a series of steps, various steps in FIG. 7 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
  obtaining, using at least one processor, an image of a scene comprising image data in each of multiple channels of a color space;
  decomposing a channel of the image into a first base layer and a first detail layer;
  generating a first enhanced detail layer by manipulating a characteristic of the first detail layer;
  decomposing the first base layer into a second base layer and a second detail layer;
  generating a second enhanced detail layer by manipulating a characteristic of the second detail layer; and
  combining the first enhanced detail layer, the second enhanced detail layer, and the second base layer to obtain an enhanced image of the scene.

2. The method of claim 1, wherein:
  detail of the image is the characteristic of the first detail layer; and
  contrast of the image is the characteristic of the second detail layer.

3. The method of claim 2, further comprising:
  suppressing noise in the first detail layer;
  wherein the first detail layer contains highest-frequency information.

4. The method of claim 3, further comprising:
  applying a smooth step function to transit between noise suppression and detail enhancement.

5. The method of claim 2, further comprising:
  manipulating contrast in the second detail layer;
  wherein the second detail layer contains mid-frequency information or low-frequency information.

6. The method of claim 1, wherein manipulating the characteristic of the first detail layer or the characteristic of the second detail layer is performed on local image patches defined by a weight map.

7. The method of claim 1, wherein:
  a sigmoid-similar function is used for manipulating the characteristic of the first detail layer or the characteristic of the second detail layer; and
  the sigmoid-similar function is applied one-sided or double-sided.

8. An electronic device comprising:
  at least one processor; and
  at least one memory containing instructions that, when executed by the at least one processor, cause the electronic device to:
    obtain an image of a scene comprising image data in each of multiple channels of a color space;
    decompose a channel of the image into a first base layer and a first detail layer;
    generate a first enhanced detail layer by manipulating a characteristic of the first detail layer;
    decompose the first base layer into a second base layer and a second detail layer;
    generate a second enhanced detail layer by manipulating a characteristic of the second detail layer; and
    combine the first enhanced detail layer, the second enhanced detail layer, and the second base layer to obtain an enhanced image of the scene.

9. The electronic device of claim 8, wherein:
  detail of the image is the characteristic of the first detail layer; and
  contrast of the image is the characteristic of the second detail layer.

10. The electronic device of claim 9, wherein:
  the instructions, when executed by the at least one processor, further cause the electronic device to suppress noise in the first detail layer; and
  the first detail layer contains highest-frequency information.

11. The electronic device of claim 10, wherein the instructions, when executed by the at least one processor, further cause the electronic device to apply a smooth step function to transit between noise suppression and detail enhancement.

12. The electronic device of claim 9, wherein:
  the instructions, when executed by the at least one processor, further cause the electronic device to manipulate contrast in the second detail layer; and
  the second detail layer contains mid-frequency information or low-frequency information.

13. The electronic device of claim 8, wherein the instructions, when executed by the at least one processor, cause the electronic device to manipulate the characteristic of the first detail layer or the characteristic of the second detail layer using a weight map.

14. The electronic device of claim 8, wherein:
  the instructions, when executed by the at least one processor, cause the electronic device to manipulate the characteristic of the first detail layer or the characteristic of the second detail layer using a sigmoid-similar function; and
  the sigmoid-similar function is applied one-sided or double-sided.

15. A non-transitory computer-readable medium containing instructions that, when executed by at least one processor, cause an electronic device to:

obtain an image of a scene comprising image data in each of multiple channels of a color space;

decompose a channel of the image into a first base layer and a first detail layer;

generate a first enhanced detail layer by manipulating a characteristic of the first detail layer;

decompose the first base layer into a second base layer and a second detail layer;

generate a second enhanced detail layer by manipulating a characteristic of the second detail layer; and combine the first enhanced detail layer, the second enhanced detail layer, and the second base layer to obtain an enhanced image of the scene.

16. The non-transitory computer-readable medium of claim 15, wherein:

detail of the image is the characteristic of the first detail layer; and contrast of the image is the characteristic of the second detail layer.

17. The non-transitory computer-readable medium of claim 16, wherein:

the instructions, when executed by the at least one processor, further cause the electronic device to suppress noise in the first detail layer; and the first detail layer contains highest-frequency information.

18. The non-transitory computer-readable medium of claim 17, wherein the instructions, when executed by the at least one processor, further cause the electronic device to apply a smooth step function to transit between noise suppression and detail enhancement.

19. The non-transitory computer-readable medium of claim 16, wherein:

the instructions, when executed by the at least one processor, further cause the electronic device to manipulate contrast in the second detail layer; and the second detail layer contains mid-frequency information or low-frequency information.

20. The non-transitory computer-readable medium of claim 15, wherein:

the instructions, when executed by the at least one processor, cause the electronic device to manipulate the characteristic of the first detail layer or the characteristic of the second detail layer using a sigmoid-similar function; and the sigmoid-similar function is applied one-sided or double-sided.

* * * * *